United States Patent [19]

McCullough et al.

[11] 3,912,802

[45] Oct. 14, 1975

[54] AMMONIUM POLYPHOSPHATES

[75] Inventors: John F. McCullough, Florence; Richard C. Sheridan, Sheffield, both of Ala.

[73] Assignee: Tennessee Valley Authority, Muscle Shoals, Ala.

[22] Filed: Dec. 5, 1973

[21] Appl. No.: 422,012

Related U.S. Application Data

[63] Continuation-in-part of Ser. No. 245,753, April 20, 1972, abandoned, which is a continuation of Ser. No. 238,604, March 27, 1972, Pat. No. 904,031, which is a continuation-in-part of Ser. No. 33,492, April 20, 1970, abandoned.

[52] U.S. Cl. .................................. 423/306; 71/43
[51] Int. Cl.$^2$ .................... C01B 15/16; C01B 25/26
[58] Field of Search .......................... 423/306; 71/43

[56] References Cited

UNITED STATES PATENTS

| | | | |
|---|---|---|---|
| 3,397,035 | 8/1968 | Shen et al. | 423/306 |
| 3,495,937 | 1/1970 | Shen | 423/309 |
| 3,645,674 | 2/1972 | Heymer et al. | 423/305 |

Primary Examiner—Oscar R. Vertiz
Assistant Examiner—Gregory A. Heller
Attorney, Agent, or Firm—Robert A. Petrusek

[57] ABSTRACT

A process for preparing long-chain crystalline ammonium polyphosphates by thermal condensation of ammonium ortho-, pyro-, or tripolyphosphates by heating in an atmosphere of ammonia at temperatures of about 250°C to about 400°C for a time sufficient to convert the reactants to a long-chain crystalline ammonium polyphosphate, usually about 1 to 16 hours.

15 Claims, No Drawings

AMMONIUM POLYPHOSPHATES

The invention herein described may be manufactured and used by or for the Government for governmental purposes without the payment to us of any royalty therefor.

This application is a continuation-in-part of our copending application Ser. No. 245,753, filed Apr. 20, 1972, now abandoned, which in turn is a continuation of application Ser. No. 238,604, filed Mar. 27, 1972 (now Defensive Publication No. T904,031), which in turn is a continuation-in-part of application Ser. No. 33,492, filed Apr. 20, 1970, now abandoned, all for AMMONIUM POLYPHOSPHATES.

Our invention relates to an improved process for the preparation of ammonium polyphosphates, and more particularly it relates to a direct method for the preparation of long-chain, substantially water-insoluble, highly condensed, crystalline ammonium polyphosphates from ammonium phosphates.

Long-chain crystalline ammonium polyphosphates are excellent high-analysis fertilizers with good physical properties containing greater than 80 percent plant nutrients (N + $P_2O_5$), e.g. 14-73-0. They are also useful in formulating fire-resistant paints and surface coatings.

Prior-art methods for the preparation of long-chain crystalline ammonium polyphosphates have been described by several investigators: C. Y. Shen, N. E. Stahlheber, and D. R. Dyroff, *J. Am. Chem. Soc.* 91, 1 (1969); C. Y. Shen and N. E. Stahlheber, U.S. Pat. No. 3,397,035; H. A. Rohlfs and H. Smith, U.S. Pat. No. 3,419,349; British Pat. No. 1,074,243; German Pat. No. 1,216,856; Belgian Pat. No. 674,161; S. Ueda, T. Nakagawa, and K. Koma, Kogyo Kagaku Zasshi 66, 589 (1963); K. O. Knollmueller, U.S. Pat. No. 3,333,921. With one exception, all variants of these processes require the heating of an ammonium phosphate or a phosphoric acid with an ammoniating agent and a condensing agent. An ammoniating agent is a material that supplies all or any part of the ammonia contained in the product and in addition supplies the required concentration of ammonia in the vapor phase over products and reactants. Materials that serve as ammoniating agents are those that supply or release ammonia under the conditions of the process. Some of the materials that can serve as ammoniating agents are ammonia, ammonium hydroxide, urea, $NH_4Cl$ and $(NH_4)_4P_2O_7$. Condensing agents are materials that combine chemically with water to remove water contained in or formed by the reacting system. Some of the condensing agents used, or suitable for use, in the above cited processes are urea, $P_2O_5$, $POCl_3$, and $PCl_5$. The use of ammoniating and condensing agents to prepare long-chain crystalline ammonium polyphosphates is illustrated by the following equations:

$xH_3PO_4 + xC(O)(NH_2)_2 = (NH_4PO_3)_x + xCO_2 + xNH_3$     (1)

$3xNH_3 + xH_3PO_4 + xP_2O_5 = 3(NH_4PO_3)_x$     (2)

$x(NH_4)_4P_2O_7 + xP_2O_5 = 4(NH_4PO_3)_x$     (3)

$2xNH_4OH + 2xNH_3 + xPOCl_3 = (NH_4PO_3)_x + 3xNH_4Cl$     (4)

In equation 1, urea functions as a combined ammoniating and condensing agent. In equation 2, the ammoniating agent is ammonia and $P_2O_5$ is the condensing agent. In equation 3, $(NH_4)_4P_2O_7$ is the ammoniating agent and $P_2O_5$ is the condensing agent. In equation 4, $NH_3$ and $NH_4OH$ are the ammoniating agents and $POCl_3$ is the condensing agent. A common feature of equations 1 through 4 is that no water is evolved from the reactions since it is combined chemically with the condensing agent. Although long-chain crystalline ammonium polyphosphate is thus formed by use of both an ammoniating and a condensing agent, the method has several disadvantages. One disadvantage is that the condensing agents are expensive; urea, for example, is entirely consumed by the reaction and furnishes only ammonia to the product. $P_2O_5$ and phosphorus halides are expensive and would be difficult to handle in a process. Another disadvantage is that some condensing agents such as urea and phosphorus halides yield impure products and tedious purification procedures must be followed to remove these impurities. As can be appreciated, therefore, a method for preparing long-chain, highly condensed, crystalline ammonium polyphosphates in high yield and free of impurities directly from ammonium phosphates without the use of condensing agents would represent an improvement in this art.

In the one exception noted above to the use of a condensing agent in the prior art of preparing long-chain crystalline ammonium polyphosphate, polyphosphoric acid containing 88.8 percent $P_2O_5$ was reacted with liquid ammonia at elevated temperature and pressure (C. Y. Shen and N. E. Stahlheber, U.S. Pat. No. 3,397,035). Since the composition of polyphosphoric acid is equivalent to metaphosphoric acid, $HPO_3$, no water is formed as shown by the following equation:

$xHPO_3 + xNH_3 = (NH_4PO_3)_x$     (5)

It should be noted, however, that in this particular example of Shen, which is the only example wherein he does not use a condensing agent such as urea, he finds it necessary to use as a starting material a long-chain polyphosphoric acid. See, for example, Huhti and Gartaganis, *Canadian Journal of Chemistry*, vol. 34, 1956, page 791. Thus, in this instance of Shen's teaching, there is no condensation of short-chain poly acids or ammoniated poly acids to produce long-chain ammonium polyphosphate. It will be further appreciated that what is accomplished here is merely ammoniation of long-chain polyphosphoric acid, which is but another embodiment of the teaching shown in Striplin, U.S. Pat. No. 2,950,961, wherein he teaches the production of liquid ammonium polyphosphate fertilizers by rapid ammoniation of the poly acid species to lock the distribution thereof in equilibrium as the ammoniated salt solutions.

Since 88.8 percent polyphosphoric acid is difficult to prepare and is not commercially available, it is apparent that a method for the preparation of long-chain crystalline ammonium polyphosphate at atmospheric pressure and from commercially available, easily handled, and well-known chemicals would be a distinct improvement in the art.

A long-chain crystalline ammonium polyphosphate has also been isolated as one of the products of ammoniation of superphosphoric acid: A. W. Frazier, U.S. Pat. No. 3,342,579; A. W. Frazier, J. P. Smith, and J. R. Lehr, *J. Agr. Food Chem.* 13, 316 (1965). Their product must be separated from gel impurities, and the yield is only 36.5 percent. It is obvious, therefore, that a method for the preparation of long-chain crystalline ammonium polyphosphates in high yields and free of troublesome byproducts would represent a significant improvement in the art.

It is known that by heating diammonium orthophosphate to a temperature above 100°C, a part of the ammonia is driven off so that monoammonium orthophosphate is formed. This compound decomposes above 170°C with loss of water and more ammonia to yield a mixture of short-chain ammonium polyphosphate and short-chain polyphosphoric acids. This mixture is tacky, hygroscopic, plastic, and difficult to handle or store. Other workers have attempted to prepare long-chain crystalline ammonium polyphosphates by treating a copper or lead polyphosphate with ammonium sulfide, or by heating ammonium trimeta- or tetrametaphosphates, but the products were mixtures and little or no long-chain crystalline polyphosphate was formed.

As noted earlier, in the teachings of Striplin there is shown the approach of converting short-chain polyphosphoric acids which, in industrial vernacular, are known as "superphosphoric acid" to their ammoniated salts or salt solution counterparts by rapidly and usually under conditions of reduced temperature mixing such acids with ammonia and water. In these instances, there is no condensation of the starting acid so the end resuslt is merely the same distribution of ammonium salts of the acid species present in the feed to the process. In a slightly different approach, other workers including Getsinger (U.S. Pat. No. 3,382,059) and McGregor (U.S. Pat. No. 3,492,087) begin with orthophosphoric acid and ammoniate same with or without additional heat under conditions where the ortho acid is condensed through incorporation of heat of ammoniation to produce ammoniated superphosphoric acid. However, here the end result is still similar to Striplin in that the resulting ammoniated super acid salts or solutions are still of short-chain length. See, for example, Getsinger, wherein he is able to convert only about 50 percent of his original ortho feed to the acyclic poly species, albeit the ammoniated form thereof. Referring again to Huhti and Gartaganis (page 790) this would be roughly equivalent, under equilibrium conditions, to a product having a distribution of about 50 percent ortho-, about 40 percent pyro-, about 8 percent tripoly-, and perhaps about 2 percent tetrapolyphosphate.

We have now discovered that friable, nontacky, nonhygroscopic, free-flowing, long-chain crystalline ammonium polyphosphates can be obtained in a simple manner by thermal condensation of short-chain length phosphates such as ammonium ortho-, pyro-, and tripolyphosphates, or mixtures thereof, in an atmosphere or stream of ammonia without the requirement for any organic compounds or other reagents to function as condensing agents.

What we have now discovered, although it might possible sound simple with the aid of our teachings and hindsight, is completely unexpected when viewed in the proper perspective of what the prior art has shown to the present time, i.e., it has led those skilled in the art to believe that it is impossible simply to take short-chain ammonium polyphosphates and convert them to very long-chain materials by a method of exposing the short-chain materials to ammonia vapors at about atmospheric pressure and at elevated temperatures. For example, many investigators have heated ammonium orthophosphates or short-chain ammonium polyphosphates, and none obtained long-chain crystalline ammonium polyphosphate by this procedure or even suggested that such a preparation could be obtained. For example, H. N. Terem and S. Akalan ["Thermal Dissociation of Phosphoric Acid and Ammonium Phosphates," Compt. rend. 288, 1437–9 (1949)] studied the behavior of mono- and diammonium orthophosphates at temperatures in the range from 120°C to 900°C; R. V. Coates and G. W. Woodard ("The Preparation, Stability, and X-Ray Powder Diffraction Data for Eleven Condensed Ammonium Phosphates," J. Chem. Soc., 1780, 1964 ) heated ammonium pyro-, tripoly-, trimeta-, and tetrametaphosphates and examined the products by paper chromatography and x-ray diffraction; E. V. Margulis et al. ("Thermal Decomposition of Ammonium Phosphates," J. Appl. Chem., USSR, 39, 2216 - 1966) studied the thermal decomposition of mono-, di-, and triammonium orthophosphates by differential thermal analysis; M. N. Nabier et al. ("Thermographic Analysis of Ammonium Phosphates," Russian Journal of Inorganic Chemistry, 14, 1556 - 1969) studied the behavior of mono-, di-, and triammonium orthophosphates by differential thermal and x-ray phase analyses.

Furthermore, several new and advantageous features over the existing process for the production of long-chain crystalling ammonium, polyphosphates shown in the prior art are realized by the present invention. Among these advantageous features of our new and unique process are (1) it utilizes commercially available raw materials, including ammoniated wet-process acid; (2) it produces quantitative yields with no by-products other than water, and the nonortho $P_2O_5$ content of the product is essentially 100 percent; (3) it obviates the requirement for the use of other materials to serve as condensing agents; (4) it is simple and convenient for permitting the production of a composition of matter which is not now available on a commercial basis, but which is highly suitable for use as a high-analysis fertilizer, as a component in mixed fertilizers, and as a component of fire-resistant paints and surface coatings; and (5) it yields a nontacky, friable product that is easily crushed to a free-flowing, nonhygroscopic, and noncaking powder.

It is therefore an object of the present invention to provide an improved process for preparing long-chain crystalline ammonium polyphosphates.

A further object of the present invention is to provide a process for preparing long-chain crystalline ammonium polyphosphates in improved yields.

Still a further object of the present invention is to provide a process of preparing long-chain crystalline ammonium polyphosphate in a desired crystalline state.

Still another object of the present invention is the economical, simple, and direct production of long-chain crystalline ammonium polyphosphates pure enough for both laboratory studies and commercial uses, and which process may utilize as raw material commercially available, inexpensive, and well known chemicals.

According to the process of our invention, an ammonium phosphate, such as monoammonium orthophosphate, is heated to a temperature between 250° and 400°C, and preferably between 250° and 300°C, in a stream or atmosphere of ammonia.

The long-chain crystalline ammonium polyphosphates produced by the process of our invention are high-molecular-weight species with the general formula $(NH_4)_m H_{(n-m)+2} P_n O_{3n+1}$, where $n$ is greater than about 50, and the ratio $m/n$ can range from 1.04 to about 0.85, but is usually about 1.0. We have noted that Shen et al., in the '035 patent supra, reports the bottom range for this m/n ratio of about 0.7; however, in our work the material produced by our process has an m/n ratio usually at about 1 and almost always greater than about 0.85. X-ray diffraction patterns for five crystalline modifications of long-chain ammonium polyphosphate were reported by Shen et al. (J. Am. Chem. Soc. 91, 1 - 1969); these modifications are designated as forms I, II, III, IV, and V.

The x-ray diffraction data for these forms of ammonium polyphosphate are summarized in Table I below.

Table I

Crystalline Modifications of Long-Chain Ammonium Polyphosphate
Five strongest x-ray diffraction lines d,
A. in order of decreasing intensity

| Form I | Form II | Form III | Form IV | Form V |
|---|---|---|---|---|
| 6.06 | 5.71 | 3.00 | 3.40 | 5.59 |
| 5.45 | 6.03 | 4.02 | 3.45 | 3.42 |
| 3.84 | 3.06 | 2.45 | 2.28 | 6.38 |
| 3.51 | 2.92 | 3.25 | 6.37 | 3.67 |
| 3.24 | 3.41 | 3.57 | 2.75 | 2.73 |

Shen et al, J. Am. Chem. Soc. 91, 1 (1969).

We have found that the crystalline modification of long-chain ammonium polyphosphate obtained is dependent upon the temperature of the condensation and the particular phosphate charged. In our process, the starting material is heated in the range between 250° and 400°C; therefore, the ammonium polyphosphates yielded by this process have melting point characteristics such that heating to as great as 400°C will not cause same to melt, albeit it may cause a crystalline modification of the polyphosphate product. At about 275°C a mixture of Forms I and II is usually obtained. Crude monoammonium orthophosphate condensed to a mixture of Forms I, II, and V at about 250°C. If added to a bed of excess Form I, ammonium orthophosphate is condensed to Form I by heating at about 250°C. Ammonium pyrophosphate gives quantitative yields of Form II at about 300°C; but ammonium tripolyphosphate is condensed to Form I at that temperature. The time of heating employed with range from about 1 hour to 16 hours, depending upon the particular ammonium phosphate being condensed. We have determined that a good practice of our invention employs a time interval of usually about 4 hours to 8 hours for the condensation of monoammonium orthophosphate. No advantage is realized in heating any of the ammonium phosphates for more than 16 hours.

In our earlier work, our process was carried out in batch type operations; however, the production of long-chain crystalline ammonium polyphosphate is advantageously carried out in a continuous process by feeding ammonium phosphate to a tumbling bed of preformed granular product which is being swept continuously with a stream of diluted or undiluted ammonia. If desired, the addition of pulverized recycle product to the feed acids helps to control the particle size of the product and usually lowers the retention time required for the reaction. The stream or moving current of ammonia promotes the formation of long-chain crystalline ammonium polyphosphate by preventing excessive loss of ammonia from the reaction bed and by sweeping away the water released by condensation of the ortho- and short-chain phosphates. This water expelled from the reactor ranges from 0.04 to 0.19 gram for each gram of product made, depending on the starting material, and should be promptly removed for best results. The quantity of ammonia used to purge the reactor should be equal to or slightly greater than that required to prepare the ammonium phosphate feed by neutralization of phosphoric acid. This amount of ammonia corresponds to 0.95 gram for each gram of water to be expelled, and no recycling is required if this amount is used as the sweep gas; however, under certain conditions, it is desirable to use an excess of ammonia which can be dried and recycled to the reactor.

Our invention, together with objects and advantages thereof, will be better understood from a consideration of the following examples which are to be taken as illustrative only and not by way of limitation. For convenience, it is noted that the first 6 examples infra reflect our earlier work wherein we carried out our process in batch-type operation, whereas the remaining examples VII-XI reflect our later work wherein we carried out our process in a continuous type operation.

BATCH OPERATION

EXAMPLE I

Twenty grams of crude monoammonium orthophosphate prepared by ammoniation of wet-process phosphoric acid was heated at 250°C for 8 hours in a slow stream of ammonia at atmospheric pressure. Thirteen and four-tenths grams of a crystalline product was obtained. X-ray analysis showed that it was a mixture of Forms I, II, and V of ammonium polyphosphate. The product contained 12.5 percent N and 69.2 percent $P_2O_5$.

EXAMPLE II

Diammonium orthophosphate (1.5 grams) was heated in a porcelain boat for 4 hours at 275°C in a stream of ammonia. It was completely condensed to long-chain ammonium polyphosphate (1.2 grams) with about 70 percent of the product as Form II and about 30 percent as Form I.

EXAMPLE III

Tetraamonium pyrophosphate (1.0 gram) was heated at 300°C for 16 hours in a stream of ammonia. The product was homogeneous as Form II ammonium polyphosphate.

EXAMPLE IV

One gram pentaammonium tripolyphosphate was heated at 300°C for 16 hours in a stream of ammonia. The product (0.8 gram) was homogeneous as Form I ammonium polyphosphate.

EXAMPLE V

One and one-half grams ammonium phosphate fertilizer (grade 15-60-0) containing about 48 percent orthophosphate, 50 percent pyrophosphate, and 2 percent tripolyphosphate was heated at 275°C for 4 hours in a stream of ammonia. The charge was completely converted to long-chain ammonium polyphosphate with about 60 to 70 percent as Form II and about 30 to 40 percent as Form I.

EXAMPLE VI

Four grams monoammonium orthophosphate was gradually added over a 2-hour period to 20 grams Form I long-chain ammonium polyphosphate which was heated to 250°C and fluidized with a stream of gaseous ammonia. The crystalline product (23.3 grams) was about 95 percent Form I and about 5 percent Form II ammonium polyphosphate.

CONTINUOUS OPERATION

Experimental data and conditions of operation of a number of runs for producing such long-chain crystalline polyphosphate by continuous rather than batch type operation are shown in Table II below.

(15-62-0) containing about 48 percent ortho-, 50 percent pyro-, and 2 percent tripolyphosphate was added from a calibrated powder feeder to a tumbling bed of previously prepared product at 250° to 275°C at rates ranging from 15.2 to 38.9 grams per hour for periods of 2.08 to 7.30 hours while ammonia or mixtures of ammonia and nitrogen were passed into the reactor. The rotating reactor described in Example VII was used, but it was tilted about 15° so that the product spilled Table II Preparation of Crystalline Long-Chain Ammonium Polyphosphates

| Run | APP Grade | g/hr. | Product recycle g/hr | Time, hr | Temp., °C | Sweep gas ml/gm raw material | %$NH_3$ | Retention time, hr. | Grams $NH_3$ charged/g $H_2O$ expelled |
|---|---|---|---|---|---|---|---|---|---|
| 1 | 12.1-61.7-0 | 24.9 | 0 | 0.83 | 250 | 1446 | 50.0 | 2.5 | 6.4 |
| 2 | " | 25.0 | 0 | 1.00 | 250 | 1440 | 66.7 | 3.1 | 6.5 |
| 3 | " | 9.3 | 0 | 2.25 | 250 | 3871 | 16.7 | 7.7 | 3.8 |
| 4 | 15-62-0 | 38.9 | 0 | 2.53 | 250 | 925 | 16.7 | 2.8 | 1.1 |
| 5 | " | 23.6 | 0 | 2.08 | 250 | 2034 | 12.5 | 3.6 | 1.9 |
| 6 | " | 26.4 | 0 | 4.25 | 270 | 886 | 100 | 3.4 | 8.3 |
| 7 | " | 22.2 | 0 | 7.30 | 275 | 1054 | 100 | 3.8 | 8.9 |
| 8 | " | 15.2 | 0 | 6.60 | 290 | 1828 | 49.7 | 4.3 | 6.9 |
| 9 | 12-57-0 | 12.5 | 0 | 7.00 | 275 | 1872 | 100 | 5.7 | 9.5 |
| 10 | 15-62-0 | 57.4 | 0 | 6.00 | 275 | 1411 | 100 | 3.5 | 10.6 |
| 11 | " | 29.8 | 6.0 | 16.20 | 275 | 4027 | 35.0 | 9.8 | 13.1 |
| 12 | " | 36.6 | 0 | 7.50 | 270 | 3279 | 35.0 | 5.0 | 9.9 |
| 13 | 12-57-0 | 50.8 | 0 | 7.20 | 300 | 2480 | 100 | 13.7 | 12.3 |
| 14 | " | 54.5 | 10.9 | 7.10 | 300 | 2312 | 100 | 8.7 | 11.1 |
| 15 | " | 91.0 | 30.3 | 6.60 | 300 | 1385 | 100 | 6.1 | 6.9 |
| 16 | " | 50.0 | 33.3 | 6.00 | 315 | 2520 | 100 | 8.9 | 11.7 |

| Run | Total, grams | Rate, g/hr | Composition % N | % $P_2O_5$ Total | Mole ratio N:P |
|---|---|---|---|---|---|
| 1 | 20.4 | 24.5 | 14.4 | 72.6 | 1.00 |
| 2 | 19.7 | 19.7 | 14.3 | 69.9 | 1.04 |
| 3 | 16.3 | 7.2 | 12.9 | 71.0 | 0.92 |
| 4 | 82.4 | 32.6 | 14.2 | 72.6 | 0.99 |
| 5 | 40.2 | 19.3 | 13.8 | 71.7 | 0.98 |
| 6 | 87.3 | 20.5 | 13.7 | 70.3 | 0.99 |
| 7 | 142.0 | 19.5 | 13.8 | 71.9 | 1.00 |
| 8 | 91.8 | 13.9 | 14.1 | 71.9 | 1.00 |
| 9 | 72.0 | 10.3 | 13.4 | 68.7 | 1.02 |
| 10 | 326 | 54.3 | 13.3 | 71.8 | 0.94 |
| 11 | 393 | 24.3 | 13.7 | 72.1 | 0.96 |
| 12 | 239 | 31.9 | 14.0 | 72.0 | 0.99 |
| 13 | 291 | 40.4 | 12.9 | 67.4 | 0.97 |
| 14 | 318 | 44.8 | 12.7 | 68.0 | 0.95 |
| 15 | 474 | 71.8 | 13.0 | 67.0 | 0.98 |
| 16 | 255 | 42.5 | 12.8 | 67.0 | 0.97 |

EXAMPLE VII

Pulverized reagent monoammonium orthophosphate (N-$P_2O_5$-$K_2O$ 12.1-61-7-0) was added from a calibrated powder feeder to a tumbling bed of previously prepared long-chain crystalline ammonium polyphosphate (50.0 grams) at 250°C at rates of 24.9, 25.0, and 9.3 grams per hour for periods of 0.83, 1.00, and 2.25 hours while passing a sweep gas (1446, 1440, and 3871 ml/gm raw material) consisting of a mixture of ammonia and nitrogen and containing 50.0, 66.7, and 16.7 percent ammonia, respectively, through the reactor which consisted of an electrically heated 600-ml stainless steel beaker mounted on a shaft rotating at 48 r.p.m. and tilted at about 45°. The product was a granular free-flowing solid consisting of a mixture of approximately equal amounts of Forms I and II long-chain crystalline ammonium polyphosphate. Yields, chemical analyses, and operating conditions are shown under runs 1, 2, and 3 in Table II, supra.

EXAMPLE VIII

Pulverized fertilizer grade ammonium polyphosphate from the open reactor as uniform, hard granules at rates in the range of 13.9 to 32.6 grams per hour. The product was a mixture of about 70 percent Form II and about 30 percent Form I long-chain crystalline ammonium polyphosphate. Yields, chemical analyses, and operating conditions are shown under runs 4, 5, 6, 7, and 8 in Table II, supra.

EXAMPLE IX

Pulverized cryde ammonium polyphosphate (N-$P_2O_5$-$K_2O$, 12-57-0) prepared from impure wet-process $H_3PO_4$ and containing 70 percent ortho-, 21 percent pyro-, and 9 percent tripolyphosphate was added from a calibrated powder feeder to a tumbling bed of product (previously prepared from the same starting material) at 275°C at a rate of 12.5 grams per hour for 7.00 hours while the reactor (described in Example VII) was purged with ammonia (1872 ml/gm raw material). The product was a dark, granular free-flowing material which discharged from the reactor at a rate of 10.3 grams per hour. The product was a mixture of Form I (about 25 percent), Form II (about 70 percent), and From III (about 1 to 5 percent) long-chain crystalline ammonium polyphosphate and about 1 to 5 percent of ferric ammonium pyrophosphate. Yields, chemical analyses, and operating data are shown under run 9 in Table II, supra.

EXAMPLE X

Pulverized fertilizer grade ammonium polyphosphate (15-62-0) containing about 48 percent orto-, 50 percent pyro-, and 2 percent tripolyphosphate was added from a calibrated powder feeder to a tumbling bed (200 grams) of previously prepared product at 270° to 300°C for periods of 6.0 to 16.2 hours while passing a sweep gas containing 35 to 100 percent ammonia through the reactor which consisted of an electrically heated glass-lined stainless steel 2000-ml beaker mounted on a shaft rotating at 48 r.p.m. and tilted about 20° from the horizontal so that the granular product spilled from the open reactor at rates in the range 29.8 to 57.4 grams per hour. The product was a white granular free-flowing solid identified as Form II long-chain crystalline ammonium polyphosphate containing a trace (1-2 percent) of amorphous material. Yields, chemical analyses, and operating conditions are shown under runs 10, 11, and 12 in Table III, supra.

EXAMPLE XI

Pulverized crude ammonium polyphosphate (12-57-0) having the composition given in Example IX was added from a calibrated powder feeder to a tumbling bed of product (previously prepared from the same starting material) at 300° or 315°C at rates of 50.0 to 91.0 grams per hour for periods of 6.0 to 7.2 hours. The reactor (described in Example X) was purged with ammonia (1385 to 2520 ml/gm raw material) an in three runs a portion of the product was recycled by blending 10.9 to 33.3 gm/hr with the feed ammonium phosphate. The product poured from the open reactor at rates ranging from 40.4 to 71.8 grams per hour (exclusive of the product recycle). The product was a granular free-flowing solid which was identified as Form II long-chain crystalline ammonium polyphosphate containing very minor amounts (1 to 5 percent) of ferric ammonium pyrophosphate and an amorphous phosphate. yields, chemical analyses, and operating conditions are shown under runs 13, 14, 15, and 16 in Table II, supra.

What we claim as new and desire to secure by letters patent of the United States is:

1. A process for the manufacture of long-chain crystalline ammonium polyphosphate having the general formula $(NH_4)_m H_{(n-m)+2} P_n O_{3n+1}$, where $n$ is greater than about 50 and where the ratio $m/n$ is in the range from 1.04 to about 0.85; which process consists essentially of the steps of heating relatively short-chain length where $n$ is less than about 4 ammonium phosphates selected from the group consisting of ortho-, pyro-, tripoly-, and mixtures thereof, at about atmospheric pressure and in an atmosphere of ammonia, said atmosphere of ammonia being maintained over the ammonium phosphate material by means of continuously sweeping said area with a gas containing about 10 volume percent to about 100 volume percent of ammonia to a temperature in the range of about 250°C to about 400°C for a period of from about 1 hour to about 16 hours to directly produce, with the requirement of a condensing agent additive supplied thereto solid long-chain where $n$ is greater than about 50 crystalline ammonium polyphosphates; and recovering as the resulting solid product long-chain crystalline ammonium polyphosphates selected from the group consisting of crystalline modification forms I, II, III, IV, V, and mixtures thereof, and containing from about 12.5 to about 14.5 percent N, and from about 69 to about 73 percent $P_2O_5$ by weight and representing substantially about 100 percent conversion of said relatively short-chain length ammonium polyphosphates to said long-chain crystalline ammonium polyphosphates.

2. A process according to claim 1 in which the ammonium phosphate is monoammonium orthophosphate.

3. A process according to claim 1 in which the ammonium phosphate is diammonium orthophosphate.

4. A process according to claim 1 in which the ammonium phosphate is ammoniated wet-process phosphoric acid.

5. A process according to claim 1 in which the ammonium phosphate is an ammonium salt of pyrophosphoric acid.

6. A process according to claim 1 in which the ammonium phosphate is an ammonium salt of tripolyphosphoric acid.

7. A process according to claim 1 in which the ammonium phosphate is ammoniated superphosphoric acid.

8. A process according to claim 1 in which the reaction is carried out at atmospheric pressure.

9. A process according to claim 1 in which the period of reaction is 1 to 8 hours.

10. A process according to claim 1 in which the product is Form I ammonium polyphosphate.

11. A process according to claim 1 in which the product is Form II ammonium polyphosphate.

12. A process according to claim 1 in which the product is Form V ammonium polyphosphate.

13. A process according to claim 1 in which the product is a mixture of Form I and Form II ammonium polyphosphate.

14. A process according to claim 1 in which the product is a mixture of Form I, Form II and Form V ammonium polyphosphate.

15. A process according to claim 1 in which the product is cooled to ambient temperature.

* * * * *

UNITED STATES PATENT AND TRADEMARK OFFICE
CERTIFICATE OF CORRECTION

PATENT NO. : 3,912,802
DATED : October 14, 1975
INVENTOR(S) : John F. McCullough and Richard C. Sheridan It is certified that error appears in the above—identified patent and that said Letters Patent are hereby corrected as shown below:

Column 4, line 23, change "crystalling" to -- crystalline --
Column 5,
      line 42, change "with" to -- will --
Column 8, line 60, change "cryde" to -- crude --
Column 9, line 12, change "orto-' to -- ortho --; line 28, change "Table III" to -- Table II --; line 39, change "an" to -- and --; line 48, capitalize "yields."
Column 10, line 10, before "the requirement" change "with" to -- without --

Signed and Sealed this ninth Day of March 1976

[SEAL]

Attest:

RUTH C. MASON
Attesting Officer

C. MARSHALL DANN
Commissioner of Patents and Trademarks